United States Patent Office 3,179,829
Patented Apr. 20, 1965

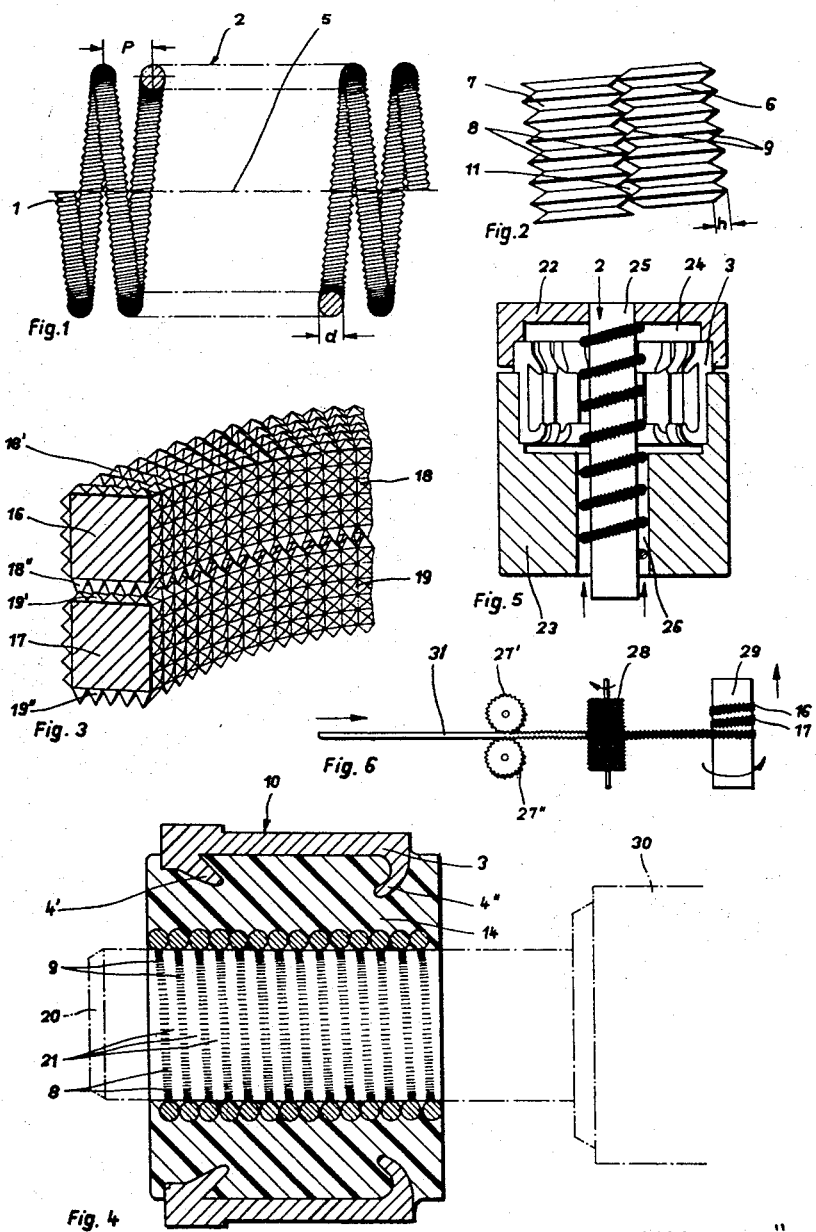

3,179,829
CURRENT COLLECTOR FOR ROTARY
MACHINES AND THE LIKE
Anton Wörner, Stuttgart, Germany, assignor to Kautt &
Bux, Stuttgart-Vaihingen, Germany, a corporation of
Germany
Filed Nov. 2, 1961, Ser. No. 149,675
Claims priority, application Germany, Nov. 3, 1960,
K 42,050
3 Claims. (Cl. 310—235)

My present invention relates to a current collector adapted to be mounted on a generally cylindrical support such as, for example, the shaft of an electric motor or generator.

Such collectors are advantageously made with an internal wire coil engageable with the machine shaft, this coil being imbedded in a plastic shell molded around it and supporting the commutator segments, slip rings or other conductive elements constituting the current-collecting section of the device. The plastic material is, conveniently, injected under pressure into a mold cavity lined by the preformed wire coil and by the conductive element or elements; this pressure, however, tends to deform the coil and, thereby, to impair the fit of the finished device on its support.

If the turns of the preformed coil are soldered together to resist deformation, not only are the costs of manufacture increased but also the coil is converted into a solid sleeve which can no longer be permeated by the plastic material whereby the bond between the parts is weakened. Partial soldering, e.g., at humps or tabs specially provided for this purpose on the individual turns, avoids the latter disadvantage but further complicates the production process.

It is, therefore, an object of my invention to provide a collector of this character which can be quickly and inexpensively manufactured and, when completed, forms a rigid and unitary structure true to its design dimensions.

Another object of this invention is to provide an annular structure of this character wherein the inner, preferably cylindrical wall surface of an annular plastic body is penetrated at axially and peripherally spaced locations by projections of a continuous metal structure so as to afford a dependable fit on a machine shaft or similar support while resisting both axial and angular displacement of the body relative to its support.

Still another object of the invention is to provide a process for conveniently producing a collector in which the foregoing objects are realized.

In accordance with one aspect of my present invention I provide a collector whose plastic body is molded about a wire coil having contiguous turns with interstices therebetween permeated by the plastic material, the coil wire being provided on at least two opposite sides—those along which adjacent turns contact one another—with surface projections interlockingly engaging one another between the turns with sufficient inter-turn clearance to form the aforesaid interstices. Advantageously, similar projections are also provided on at least a third side of the wire, i.e., the one which defines the inner wall of the annular collector body, the last-mentioned projections then penetrating the plastic along the inner wall to make direct contact with the outer periphery of the associated support and to grip it with an accurately centered fit.

The surface projections of the coil wire may be in the form of a continuous helical ridge produced by subjecting conventional round wire to a screw-threading process; they could also be produced by knurling or embossing, e.g., by passing a wire of rectangular or otherwise polygonal cross-section between suitable profiled rollers. If the patterns are somewhat different on opposite sides of the wire facing in axial direction of the coil, i.e., along adjoining contact surfaces of successive wire turns, the desired interstices will remain even if the coil is axially compressed until the turns approach one another as closely as possible; in other instances, e.g., with uniformly threaded wire, such axial compression must be limited to less than its maximum. Particularly in the latter case it will be desirable, pursuant to another aspect of my invention, to make the coil of relatively stiff resilient material and to exert axial pressure upon it by the injected plastic mass so that the turns are compacted within the mold cavity, to the prescribed extent, and remain in this condition until the plastic has hardened around them.

The above and other objects, features and advantages of my invention will become more fully apparent from the following detailed description given with reference to the accompanying drawing in which:

FIG. 1 is a side-elevational view of a threaded wire coil adapted to be used in a collector according to the invention;

FIG. 2 is an enlarged fragmentary view of the same coil, showing contiguous parts of two of its turns in the axially compressed state of the coil;

FIG. 3 is a fragmentary perspective view of a modified coil, showing contiguous parts of two of its turns;

FIG. 4 is an axial sectional view of a complete collector incorporating a coil of the type shown in FIGS. 1 and 2;

FIG. 5 is a view showing in axial section a mold used for making a collector as illustrated in FIG. 4; and FIG. 6 diagrammatically illustrates the process of making a coil of the type shown in FIG. 3.

In FIG. 1 I have shown a coil 2 formed from screw-threaded round wire 1 of stiff resilient material, e.g., steel, whose turns are wound with a pitch $p$ which at this stage is about twice the outer wire diameter $d$. Upon subsequent compression of this coil in the direction of its axis 5, e.g., in the manner hereinafter described with reference to FIG. 5, the coil assumes the position illustrated in FIG. 2 wherein two of its turns, designated 6 and 7, are shown with their threads 8, 9 in partly interlocking relationship so that interstices 11 are formed therebetween. The extent of the overlap of the threads 8, 9 in FIG. 2 corresponds to approximately half the height $h$ of these threads; this interengagement of the threads prevents any appreciable relative shifting of the turns and secures the coil against deformation during the subsequent molding process.

FIG. 3 shows part of a modified coil composed of wire of substantially square cross-section bearing a pattern of cross-cut knurls on three of its surfaces. The contiguous turns 16, 17 of the wire illustrated in this figure are provided on opposite, axially facing sides with slightly different patterns 18', 18" and 19', 19" which fit only imperfectly into each other, as particularly shown for the contacting surfaces 18" and 19', whereby a system of intercommunicating passages or interstices is again formed between these turns. The patterns 18, 19 on the third, concave sides of the turns 16, 17 may be identical with either the pattern 18', 19' or the pattern 18", 19", or may differ from both.

In FIG. 4 the turns of wire 1 of a coil as shown in FIGS. 1 and 2 are imbedded in the inner wall of an annular body 14 of molded plastic material, the crests of the teeth 8, 9 penetrating the plastic wall in a helicoidal pattern while the intervening spaces 21 are filled with the plastic material permeating the interstices 11 (FIG. 2). Conductive segments 3 are distributed over the outer periphery of the body 14 and are partly imbedded in the plastic while being anchored thereto with the aid of spurs 4', 4". The collector 10 so constituted is tightly fitted onto the shaft 20 of an electrical machine 30 to whose interior the segments 3 are connected by suitable conductors not shown.

FIG. 5 shows a bipartite mold 22, 23 defining an annular cavity 24 around a core 25 on which the coil 2 of FIG. 1 is initially wound with relatively wide turn spacing. Fluid plastic material is injected under pressure through a channel 26 so as to bear axially upon the coil 2 before entering the cavity 24, the coil being thereby compacted into the position illustrated in FIGS. 2 and 4. The segments 3 in the mold cavity and the compacted coil are then joined together by the hardening plastic material to form the collector 10 of FIG. 4.

FIG. 6 shows a wire 31 of substantially square cross-section fed past several pairs of knurling rollers including a horizontal pair 27', 27" and a vertical pair of which only one roller 28, whose mate may be smooth-faced, has been shown. These rollers produce the profiles 18', 18" and 18 (or 19', 19" and 19) of FIG. 3, the knurled wire being then wound upon a capstan 29 which rotates and advances in the directions shown by the arrows whereby the turns 16, 17 of the resulting coil are brought into closely juxtaposed and interengaging relationship and no further axial compression is necessary. The wire 31 may for this purpose consist of a material of relatively low resiliency, such as copper or brass. It will be apparent that the rollers of FIG. 6 could be replaced by a conventional screw-threading device to make the wire coil of FIG. 1.

My invention is, of course, not limited to the specific embodiments described and illustrated but may be realized in various adaptations and modifications without departing from the spirit and scope of the appended claims.

I claim:
1. A current collector for a rotary machine, comprising a molded annular body of insulating material, conductor means anchored to said body along the outer periphery thereof, and a helically coiled elongated metallic element imbedded in the inner periphery of said body, adjacent turns of said element being in continuously abutting relationship and being provided at least along their abutting surfaces with peripherally spaced teeth, the teeth of each turn partly fitting between the teeth of an adjacent turn in interlocking relationship therewith and preventing the uncoiling of said element while leaving interstitial gaps between said turns, said gaps being occupied by said insulating material.

2. A collector according to claim 1 wherein said element is a wire of round cross-section and threaded over substantially its entire length, said teeth being formed by the threads of said wire, the threads of said turns being interleaved with one another.

3. A collector according to claim 1 wherein said element is a wire of polygonal cross-section and provided on at least some of its surfaces with embossed patterns forming said teeth.

References Cited by the Examiner
UNITED STATES PATENTS 2,956,190  10/60  Bechstein et al. _____ 310—235

FOREIGN PATENTS 107,637  6/43  Sweden.

MILTON O. HIRSHFIELD, *Primary Examiner.*